No. 680,000. Patented Aug. 6, 1901.
L. SERPOLLET.
VALVE GEAR MECHANISM FOR SINGLE ACTING ENGINES.
(Application filed Mar. 27, 1900.)
(No Model.) 4 Sheets—Sheet 1.
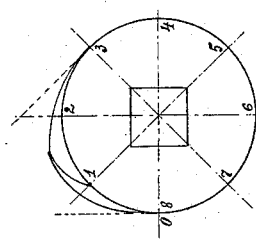
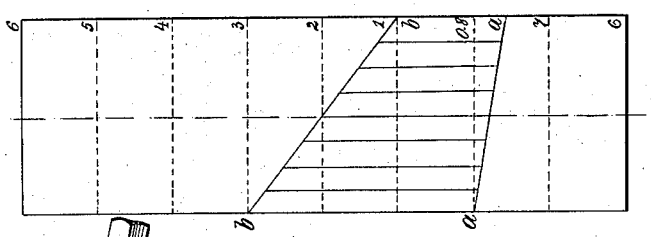
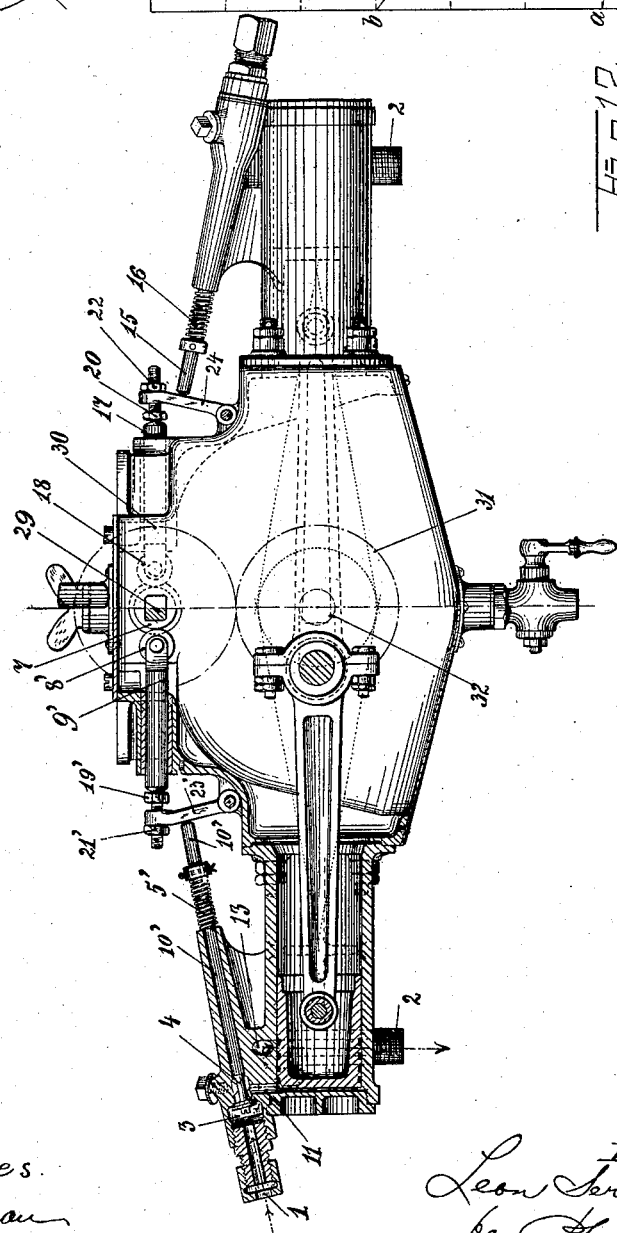
Witnesses.
Inventor
Leon Serpollet
by Philip Mauro
his attorney

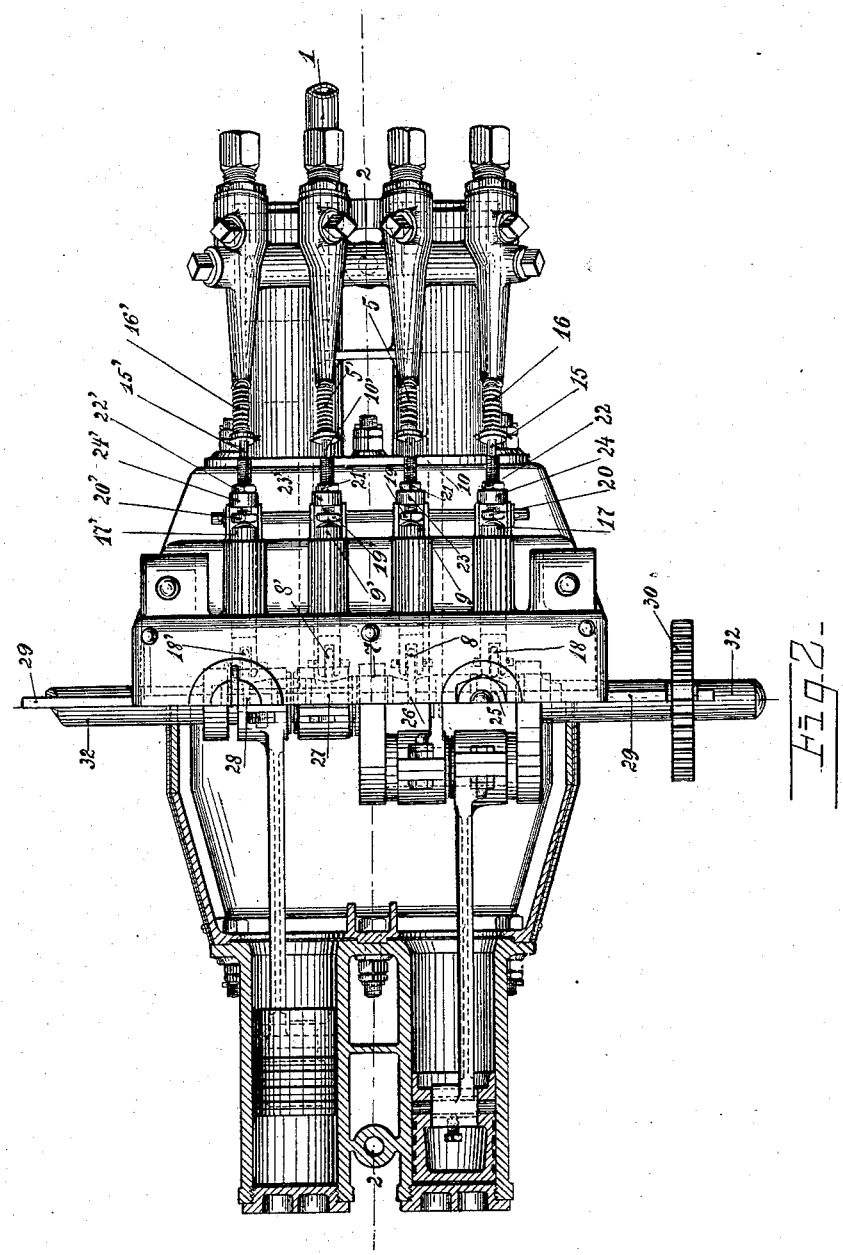

No. 680,000. Patented Aug. 6, 1901.
L. SERPOLLET.
VALVE GEAR MECHANISM FOR SINGLE ACTING ENGINES.
(Application filed Mar. 27, 1900.)
(No Model.) 4 Sheets—Sheet 3.
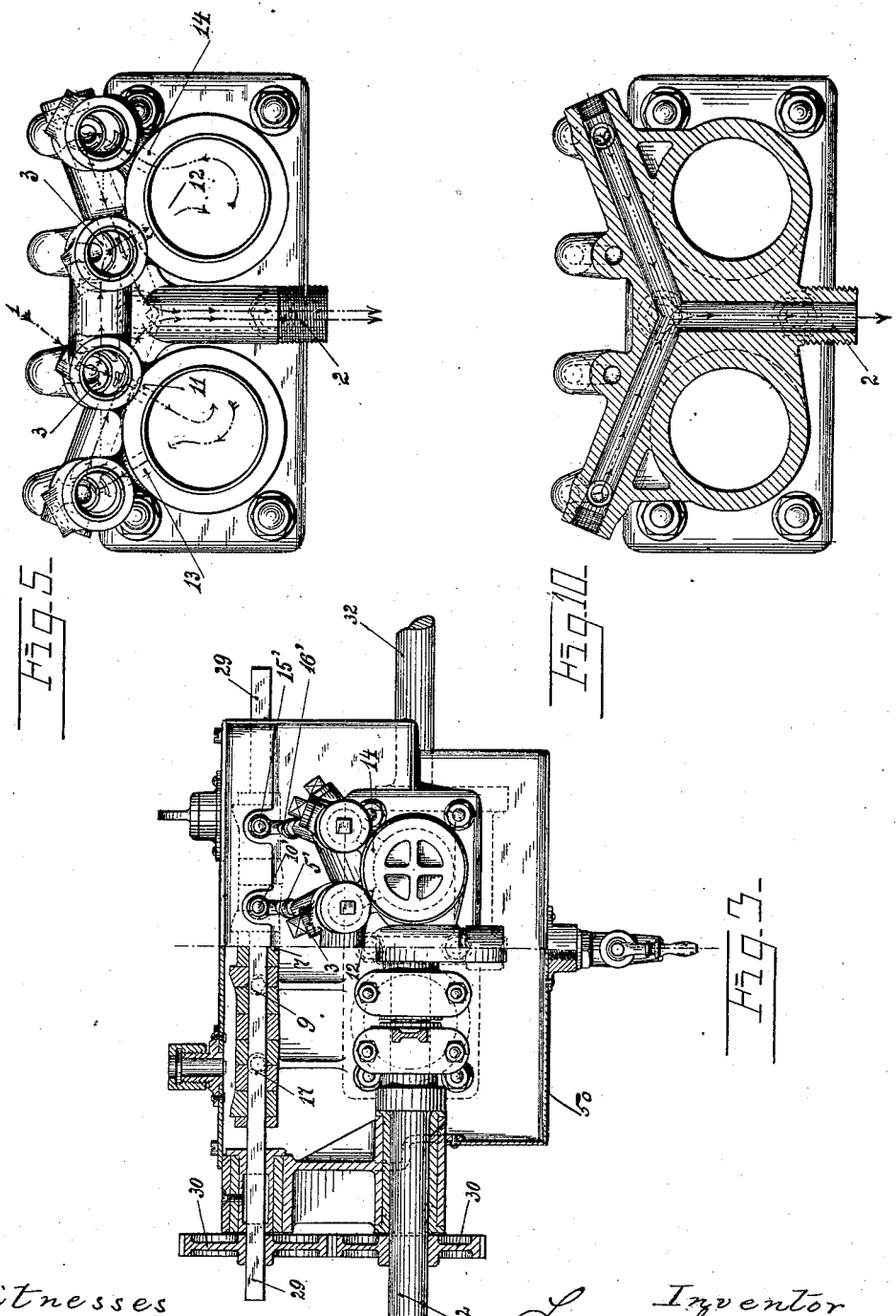

No. 680,000. Patented Aug. 6, 1901.
L. SERPOLLET.
VALVE GEAR MECHANISM FOR SINGLE ACTING ENGINES.
(Application filed Mar. 27, 1900.)
(No Model.) 4 Sheets—Sheet 4.
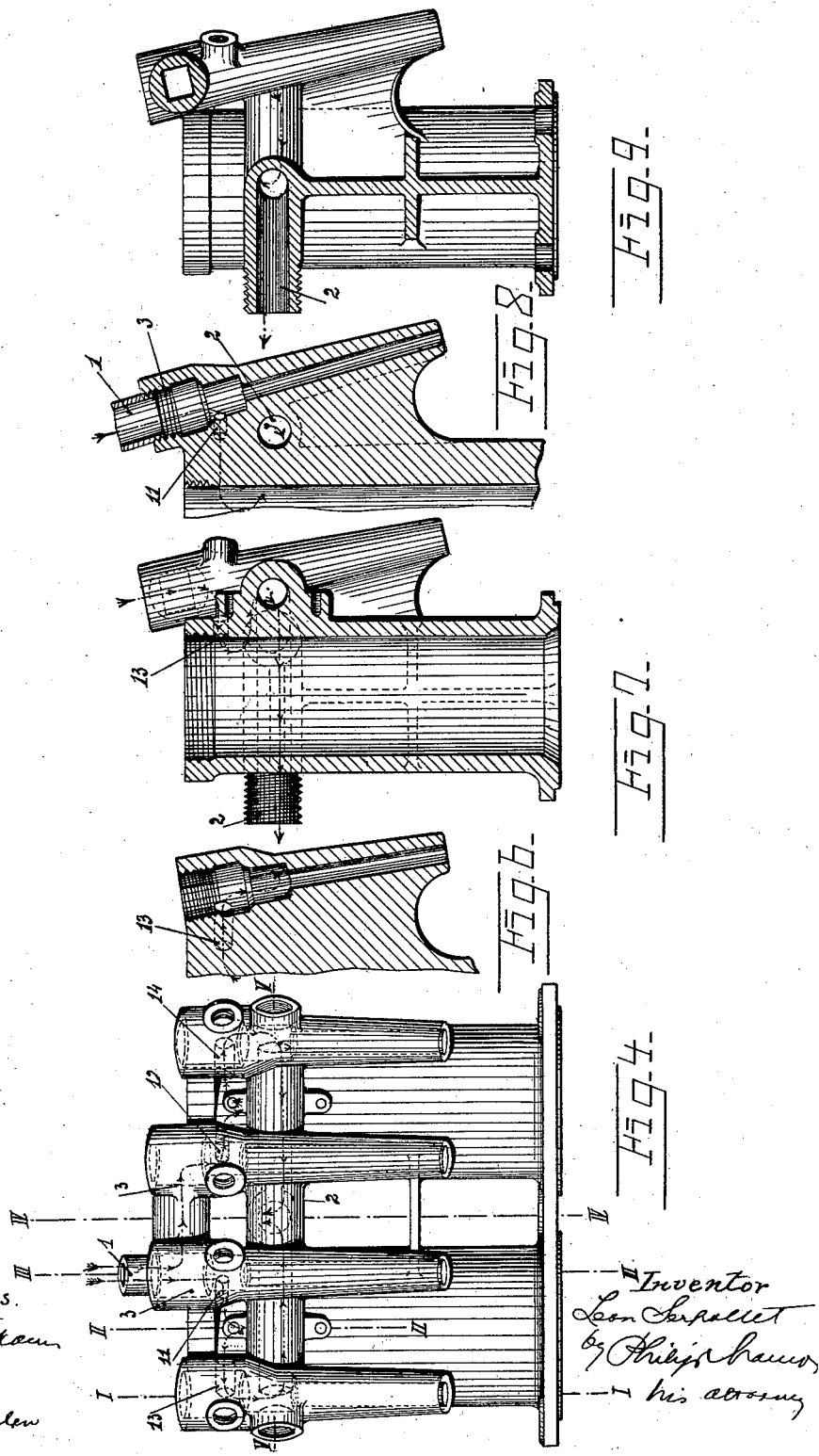

UNITED STATES PATENT OFFICE.

LEON SERPOLLET, OF PARIS, FRANCE.

VALVE-GEAR MECHANISM FOR SINGLE-ACTING ENGINES.

SPECIFICATION forming part of Letters Patent No. 680,000, dated August 6, 1901.

Application filed March 27, 1900. Serial No. 10,357. (No model.)

*To all whom it may concern:*

Be it known that I, LEON SERPOLLET, of the city of Paris, in the Republic of France, have invented new and useful Improvements in Valve-Gear Mechanism for Single-Acting Engines, which improvements are fully set forth in the following specification.

The new steam distribution and exhaust mechanism for high-speed single-acting engines which is capable of exact adjustment and which has neither joints nor levers is characterized by a combination of a central cam having successive multiple actions of a generally known type with independent inlet and exhaust valves operating mechanically under and against the pressure of the steam, assisted by the tension of springs, an essential sliding piece of variable length which carries the roller bearing against the cam and which may be adjusted in length so as exactly to take up the play, being inserted between the cam and the rod of each valve, in the prolongation of that rod.

In order that the following description may be understood, four sheets of drawings are annexed hereto, of which—

Figures 1, 2, and 3 show, respectively, first, a vertical half-section on the left hand along the axis of one of the cylinders and along the axis of an admission-valve and a half-elevation; second, a horizontal half-section along the axis situated in a single plane and a half-plan with the rods of the four valves forming the right-hand group, an admission and an exhaust valve corresponding to each cylinder, and, third, a half end view on the right, showing the end of the cylinders and the valves and on the left a vertical half-section along the axis of the cam-shaft. Fig. 4 is a plan showing the various admission and exhaust passages for the steam. Fig. 5 is an end view of the preceding figure. Figs. 6, 7, 8, 9, and 10 show, respectively, sections on the lines I II III IV V of Fig. 4. Lastly, Figs. 11 and 12 show, respectively, a section of the cam-shaft through a cam of special profile, causing to vary simultaneously with the duration of the admission the lead at the admission, and a development of this cam.

The device in question is hereinafter described, and the path of the steam from the inlet-orifice to the exhaust, indicated by dotted lines hereinafter (—·—·—·—·— for admission and —··—··—··—··— for exhaust) and by arrows, helps to make the description relating to the figures understood.

The steam arrives from the boiler at high pressure through the orifice 1, Figs. 1, 2, 4, 5, and 8, and exhausts through the orifice 2 after having acted in the single-acting cylinder corresponding to the group of cylinders considered. On entering by the orifice 1 the steam passes into the valve-box 3, in which works the admission-valve 4, Fig. 1, which is held to its seat by the direct action of the steam and by the supplementary action of the spring 5 or 5', Figs. 1 and 2, and which can be opened more or less only under the action of the corresponding portion or incline of the central multiple-action cam 7, acting by means of a roller 8 and a slide-rod 9 on the inclined rod 10 of the corresponding valve. As soon as one of the valves 4 is open the steam passes to the corresponding cylinder through one of the passages 11 or 12, Figs. 1, 4, 7, and 8, to return by other passages 13 and 14 of greater section, Figs. 1, 4, 5, and 6, when the expansion of the steam in the cylinder has taken place and the piston after having accomplished its working stroke begins its return movement. The exhaust-passages to the cylinders being larger than the exhaust-passages thereof, back pressure is avoided. As soon as the piston reaches the end of its working stroke and is about to begin its return movement the cam-surfaces which open the exhaust-valves begin to act on the rods 15 15' for operating said exhaust-valves, Figs. 1, 2, and 3, and these latter valves rise, opening a passage for the exhaust-steam until the piston which drives back this steam has reached a certain point in the return stroke, after which the corresponding incline of the cam 7 having passed against and in front of the roller 8 the corresponding exhaust-valve 15 or 15' closes under the combined action of the steam and the spring 16 or 16', Figs. 1, 2, and 3, and the steam inclosed in the portion of the cylinder remaining to be traversed by the piston is compressed.

Between the rod of each valve and the common central cam, with its successive multiple action and inclines, are inserted the sliding rods 9 9' 17 17', of which one extremity, shaped like a fork, carries a roller 8 or 8' or 18 or 18', while the other end abuts against a screw with a head 19 or 19' or 20 or 20', which can be adjusted exactly in length and fixed by means of a lock-nut 21 or 21' or 22 or 22'.

Between each screw-head 19 19' 20 20' and the corresponding nut 21 or 21' or 22 or 22' is mounted a device forming an operating means for the adjusting device, which may be the levers 23 23' and 24 24', against which the inclined rods 10 10' 15 15' bear. In this way by means of this intermediate and distinct part all wear likely to arise can be taken up and perfect contact insured at all times between the cam and the rollers and between the sliding intermediate piece and the valve-rods.

The distribution-cam 7, placed above the gear-case, its axis being located in the same vertical plane as the engine-shaft, has as many intermediate cylindrical surfaces or stopping-surfaces 25, 26, 27, and 28 (see Fig. 2) as there are rollers on the same side of the cam, and these rollers are opposite to these surfaces when the engine is stopped, placed thus between two inclines in opposite directions ending in cylindrical surfaces with a boss corresponding to the maximum admission and exhaust. The cam 7, which has successive multiple actions controlling the admission and exhaust, is secured to a shaft 29, adapted to be moved in one direction or the other, either manually or by automatically-operated means, and alter simultaneously and equally the conditions of the admission and of the exhaust, as has been hereinbefore described.

On the end of the square shaft 29 there is mounted the toothed wheel 30, engaging with the wheel 31, of the same diameter, keyed to the engine-shaft 32. In order to vary the lead of admission or exhaust, gear-wheel 30, Fig. 3, may be moved to the left along shaft 29 out of engagement with gear-wheel 30 and gear 30 and its shaft carrying the actuating-cams turned backward or forward the distance of one tooth, for example, and then again brought into engagement with gear 30, the position of which has not changed.

The toothed wheel 30 is mounted on the square shaft 29, which carries the central cam 7, and slides in this wheel on one hand and in a bush on the other side of the frame to admit of alterations in the admission. The adjustment is effected by causing the teeth of this wheel to enter into those of the wheel 31 at the desired position, as has been explained. This adjustment can therefore be effected in every case to a tooth, and if the number of the teeth has been made prime with four (the number of the sides of the shaft) this adjustment may then be made to a quarter of a tooth.

The arrangement forming the subject-matter of Figs. 11 and 12 allows the lead at the admission to be varied at the same time as the duration of the admission by a special projection of the inclines of the cams. Thus as the engine has to run at very different speeds and has to give at the same time a very variable output it is necessary when it runs slowly at high pressure to diminish the lead, while when it has to produce little power when running at high speed and under reduced pressure—as, for example, on a level—it is economical to give lead. This increase in the lead at the moment when the admission is reduced and when the speed of the engine increases at the same time as its output is reduced is an indispensable condition for the good working of a high-speed engine. As may be clearly seen from Figs. 11 and 12, the projection of the inclines of the cam as shown allows this increase of lead to be obtained automatically at the same time as the admission is reduced. The dead-point of the piston corresponds to the point 0.8 of the cam. In the development, Fig. 12, the incline corresponding to the beginning of the admission $a\ a$ and the incline corresponding to the end of the admission $b\ b$ show clearly that the lead comprised between the lines $O\ a$ and $a\ a$ varies at the same time as and in an inverse ratio to the duration of admission comprised between the lines $O\ a$ and $b\ b$.

By disposing the valve-rods 10, 10', 15, and 15' in an inclined position a more compact arrangement is secured than in the case of the apparatus of my Patent No. 636,926, of November 14, 1899, (on which the present invention is an improvement,) wherein the valve-rods are horizontally disposed.

As most clearly shown in Fig. 3, the bottom 50 of the chamber or gear-casing between the cylinders is made of thin sheet-iron, which readily dissipates any heat acquired by the oil (in which the parts work) contained in the chamber.

From the drawings and the foregoing description it will be seen that the steam-inlet and steam-exhaust passages are separated and removed from each other, so that the lower temperature of the exhaust-steam will not be imparted to or detrimentally influence the higher temperature of the ingoing steam.

I claim—

1. In a steam-engine, the combination with a cylinder and its piston, of a steam admission or exhaust valve, a valve-rod for said valve movable in a longitudinal direction only, a rotatable cam and connections for driving the same, a sliding rod movable in a longitudinal direction only and actuated by said cam, and an adjustable connection for transmitting movement from the sliding rod to the valve-rod.

2. In a steam-engine, the combination with a cylinder and its piston, of a steam admission or exhaust valve, a valve-rod for said valve movable in a longitudinal direction only, a rotatable cam and connections for driving the same, a sliding rod movable in a longitudinal direction only and actuated by said cam, a lever pivoted at one end and at its other end adjustably connected to the sliding rod, said lever being adapted when moved to come into contact with and transmit movement to the valve-rod for opening the valve.

3. In a steam-engine, a cylinder and its piston, a gear-casing at one end of and projecting above the cylinder, a steam admission or exhaust valve on the cylinder, a valve-rod inclined upwardly from each valve movable in a longitudinal direction only, a rotatable cam located at the upper part of the gear-case and connections for driving the same, a sliding rod movable in a longitudinal direction only and actuated by said cam, and means for transmitting motion from the sliding rod to the valve-rod.

4. In a steam-engine, a cylinder and its piston, a steam-admission valve for the cylinder, a valve-rod for said valve, a rotatable cam, means transmitting movement from the cam to the valve-rod, a shaft on which the cam is mounted, a gear-wheel on said shaft, a second gear-wheel rotated from a driven part of the engine and meshing with the first-mentioned gear-wheel to drive the cam-shaft, and means for changing the position of engagement of the two gear-wheels to vary the lead of steam admission.

5. In a multiple-cylinder engine, two or more cylinders and pistons for the same, a gear-casing having a thin sheet-metal bottom interposed between the cylinders and adapted to contain a lubricant in which the piston connections operate.

6. In a steam-engine, a cylinder, a steam-admission valve for the cylinder, and a cam-surface of varying width for opening said valve the edge or side of said surface corresponding to the beginning of steam admission to the cylinder being inclined so that the lead of admission may be varied by altering the position of the cam-surface with relation to the valve and the edge or side of said cam-surface corresponding to the termination of admission being at a greater inclination whereby the duration of admission decreases as the lead of admission increases.

7. In a steam-engine, a cylinder, a steam-admission valve for the cylinder, and a rotatable cam-surface of varying width opening said valve the edge or side of said surface corresponding to the beginning of steam admission to the cylinder being inclined so that the lead of admission may be varied by altering the position of the cam-surface with relation to the valve and the edge or side of said cam-surface corresponding to the termination of admission being at a greater inclination whereby the duration of admission decreases as the lead of admission increases.

In testimony whereof I have signed this specification in the presence of two subscribing witnesses.

LEON SERPOLLET.

Witnesses:
 TOMINIQUE CASALONZA,
 ANTONIO FERNAND DE LA CALLE.